(12) United States Patent
deVarona

(10) Patent No.: US 10,457,309 B2
(45) Date of Patent: Oct. 29, 2019

(54) CARRIER FOR TRANSPORTING A COOLER AND A GRILL, AND RELATED METHODS AND SYSTEMS

(71) Applicant: Jana deVarona, Seattle, WA (US)

(72) Inventor: Jana deVarona, Seattle, WA (US)

( * ) Notice: Subject to any disclaimer, the term of this patent is extended or adjusted under 35 U.S.C. 154(b) by 119 days.

(21) Appl. No.: 15/589,785

(22) Filed: May 8, 2017

(65) Prior Publication Data

US 2018/0162430 A1 Jun. 14, 2018

Related U.S. Application Data

(60) Provisional application No. 62/433,143, filed on Dec. 12, 2016.

(51) Int. Cl.
*F24B 1/20* (2006.01)
*B62B 3/10* (2006.01)
(Continued)

(52) U.S. Cl.
CPC ............. *B62B 3/10* (2013.01); *A47J 37/0786* (2013.01); *A47J 41/00* (2013.01); *A47J 47/005* (2013.01);
(Continued)

(58) Field of Classification Search
CPC ...................................................... F24B 1/205
See application file for complete search history.

(56) References Cited

U.S. PATENT DOCUMENTS 4,232,488 A * 11/1980 Hanley ................ B60P 3/0252
  108/166
4,757,755 A *  7/1988 Sarten .................... A47J 37/06
  108/44

(Continued)

FOREIGN PATENT DOCUMENTS

CN    204306683 U    5/2015
GB       103718 A  *  2/1917 .............. F24B 1/207

OTHER PUBLICATIONS

Thermos Fire and Ice Grill, http://thermosgasgrill.org/thermos-fire-and-ice-grill.html, 2 pages, last accessed Dec. 23, 2016.

(Continued)

*Primary Examiner* — Gregory A Wilson
(74) *Attorney, Agent, or Firm* — Janeway Patent Law, PLLC; John M. Janeway

(57) ABSTRACT

A carrier for transporting a grill and cooler over difficult terrain includes a chassis that includes a first frame and a floor. The first frame has a front end that includes a front axle to which a front wheel may be coupled with and rotatable about, and a rear end that includes a rear axle to which a rear wheel may be coupled with and rotatable about. The floor is coupled with the first frame, and together, the first frame and the floor define a receptacle disposed between the front and rear wheel and that is configured to hold a cooler. The carrier also includes a second frame coupled with the chassis and operable to hold a grill. The second frame is positionable relative to the first frame to: 1) a first position where the grill is operable to cook food when the second frame holds the grill, and 2) a second position where the grill is stored for transportation when the second frame holds the grill. Because the receptacle is disposed between front and rear wheels, which may be sized to provide easy rolling over difficult terrain, such as loose sand of a beach, or an uneven path in the woods or desert, the carrier can easily and stably transport a cooler full of ice, food and drinks. And because the second frame of the carrier is positionable relative to the first frame of the carrier's chassis, the grill may be easily positioned adjacent the cooler while transporting the grill and cooler over difficult terrain, and repositioned above the cooler while it cooks food.

20 Claims, 9 Drawing Sheets

(51) Int. Cl.
*B62B 3/12* (2006.01)
*A47J 37/07* (2006.01)
*A47J 41/00* (2006.01)
*A47J 47/00* (2006.01)
*B62B 5/06* (2006.01)

(52) U.S. Cl.
CPC ............... *B62B 3/12* (2013.01); *B62B 5/067* (2013.01); *A47J 2037/0777* (2013.01); *B62B 2202/52* (2013.01); *B62B 2204/00* (2013.01)

(56) References Cited

U.S. PATENT DOCUMENTS

| | | | | |
|---|---|---|---|---|
| 4,757,756 A * | 7/1988 | Van Marr | ............ | A23B 4/052 |
| | | | | 126/21 A |
| 5,031,602 A * | 7/1991 | Vick | ............ | A47J 37/0713 |
| | | | | 126/1 AA |
| 5,558,359 A * | 9/1996 | Phears | ............ | B62B 3/12 |
| | | | | 280/47.371 |
| 5,711,209 A * | 1/1998 | Guines | ............ | A47J 37/07 |
| | | | | 126/25 R |
| 6,416,101 B1 * | 7/2002 | Bartch | ............ | B60P 3/0257 |
| | | | | 296/168 |
| 6,422,230 B1 * | 7/2002 | Stewart | ............ | A47J 37/0763 |
| | | | | 126/25 R |
| 6,557,547 B1 * | 5/2003 | MacIntosh | ......... | A47J 37/0713 |
| | | | | 126/268 |
| 6,575,155 B2 | 6/2003 | Brennan | | |
| 6,792,935 B2 * | 9/2004 | Williams | ............ | A47J 37/0763 |
| | | | | 126/25 R |
| 8,672,200 B2 * | 3/2014 | O'Hare | ............ | B60R 9/06 |
| | | | | 224/519 |
| 2005/0252504 A1 | 11/2005 | Cabrera et al. | | |
| 2011/0094493 A1 * | 4/2011 | Malumyan | ......... | A47J 37/0704 |
| | | | | 126/25 R |
| 2015/0251678 A1 * | 9/2015 | Bruno | ............ | B62B 1/208 |
| | | | | 280/645 |
| 2016/0100714 A1 | 4/2016 | Dokhanian et al. | | |

OTHER PUBLICATIONS

Char-Broil Grill 2 Go Ice Real Tree Edition TRU Infrared Grill, Amazon.com, https://www.amazon.com/char-broil-grill-real-edition-infrared/dp/b007f . . . , 6 pages, last accessed Dec. 23, 2016.

* cited by examiner

CARRIER FOR TRANSPORTING A COOLER AND A GRILL, AND RELATED METHODS AND SYSTEMS

CROSS REFERENCE TO RELATED APPLICATION AND CLAIM OF PRIORITY

This application claims priority from commonly owned U.S. Provisional Patent Application 62/433,143 filed 12 Dec. 2016, and titled "A System for Facilitating a Party Anywhere, and Related Components and Methods", presently pending and incorporated by reference.

BACKGROUND

Many people enjoy eating outdoors, under the sun. Some enjoy this just before the start of a sporting event, such as football game. Some enjoy this on the beach as the sun sets. And some enjoy this in the woods or out in the country away from many people. Unfortunately, the more remote a location is—such as by a river in the woods —or the more difficult it is to transport a conventional grill and cooler to a location—such as onto the beach—the more difficult it is to cook a meal outdoors. In such situations, people often carry previously made food that does not need to be heated, or carry, separately, a grill and food to be cooked by the grill. But eating previously prepared food just isn't the same as eating a freshly cooked meal. And carrying the grill and food separately can be awkward if done in the same trip, and time consuming if done in separate trips.

Thus, there is a need for a carrier that can easily transport a grill and cooler over difficult terrain.

SUMMARY

In an aspect of the invention, a carrier for transporting a grill and cooler over difficult terrain includes a chassis that includes a first frame and a floor. The first frame has a front end that includes a front axle to which a front wheel may be coupled with and rotatable about, and a rear end that includes a rear axle to which a rear wheel may be coupled with and rotatable about. The floor is coupled with the first frame, and together, the first frame and the floor define a receptacle disposed between the front and rear wheel and that is configured to hold a cooler. The carrier also includes a second frame coupled with the chassis and operable to hold a grill. The second frame is positionable relative to the first frame to: 1) a first position where the grill is operable to cook food when the second frame holds the grill, and 2) a second position where the grill is stored for transportation when the second frame holds the grill.

Because the receptacle is disposed between front and rear wheels, which may be sized to provide easy rolling over difficult terrain, such as loose sand of a beach, or an uneven path in the woods or desert, the carrier can easily and stably transport a cooler full of ice, food and drinks. And because the second frame of the carrier is positionable relative to the first frame of the carrier's chassis, the grill may be easily positioned adjacent the cooler while transporting the grill and cooler over difficult terrain, and repositioned above the cooler while it cooks food.

In another aspect of the invention, a method for transporting a grill and cooler over difficult terrain includes holding, with a second frame of a carrier's chassis, a grill that is operable to cook food. The second frame being coupled with a first frame of the chassis and positionable relative to the first frame to a first position where the grill is operable to cook food, and a second position where the grill is stored for transportation. The method also includes holding, in a receptacle that is defined by the first frame and a floor of the carrier's chassis, a cooler that is operable to keep an internal volume at a temperature that is lower than the ambient environment's temperature. The receptacle being disposed between a front wheel of the chassis and a rear wheel of the chassis. The method further includes moving the carrier such that the front and rear wheels roll over the difficult terrain.

DETAILED DESCRIPTION

Figure 1:
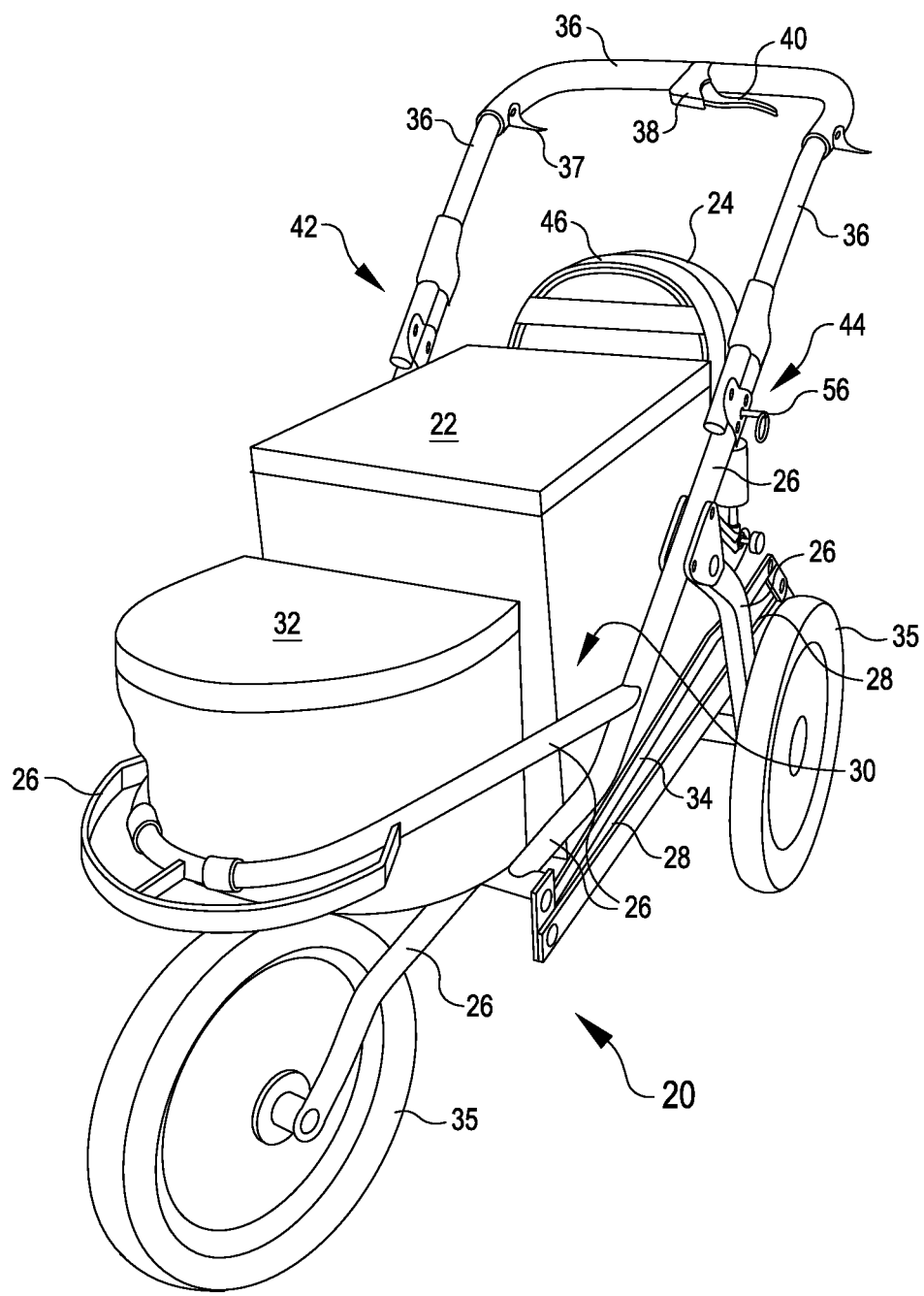
FIG. 1 shows a perspective view of a carrier transporting a cooler and a grill, according to an embodiment of the invention.
Figure 2:
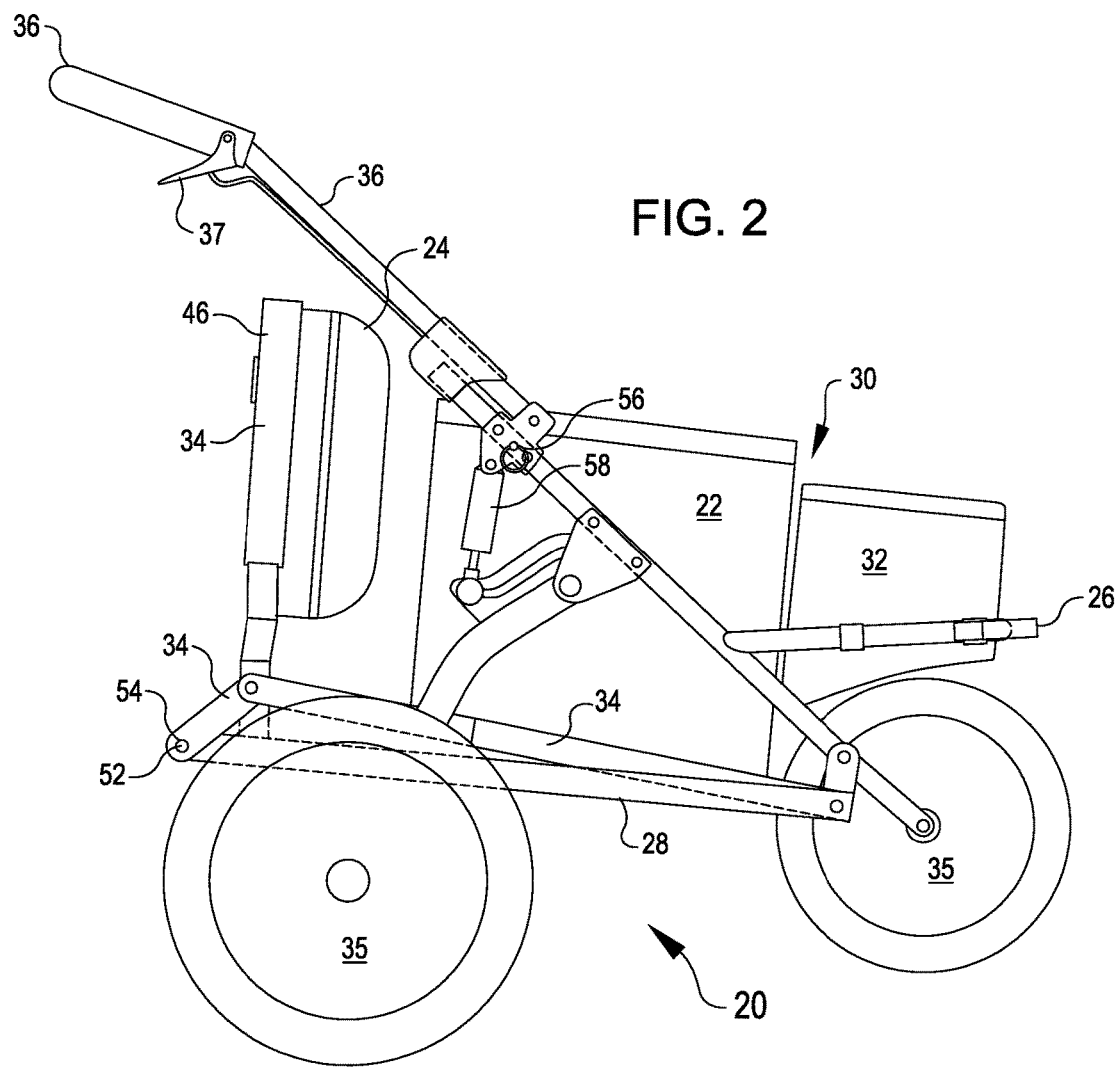
FIG. 2 shows a different perspective view of the carrier shown in FIG. 1, according to an embodiment of the invention.
Figure 3:
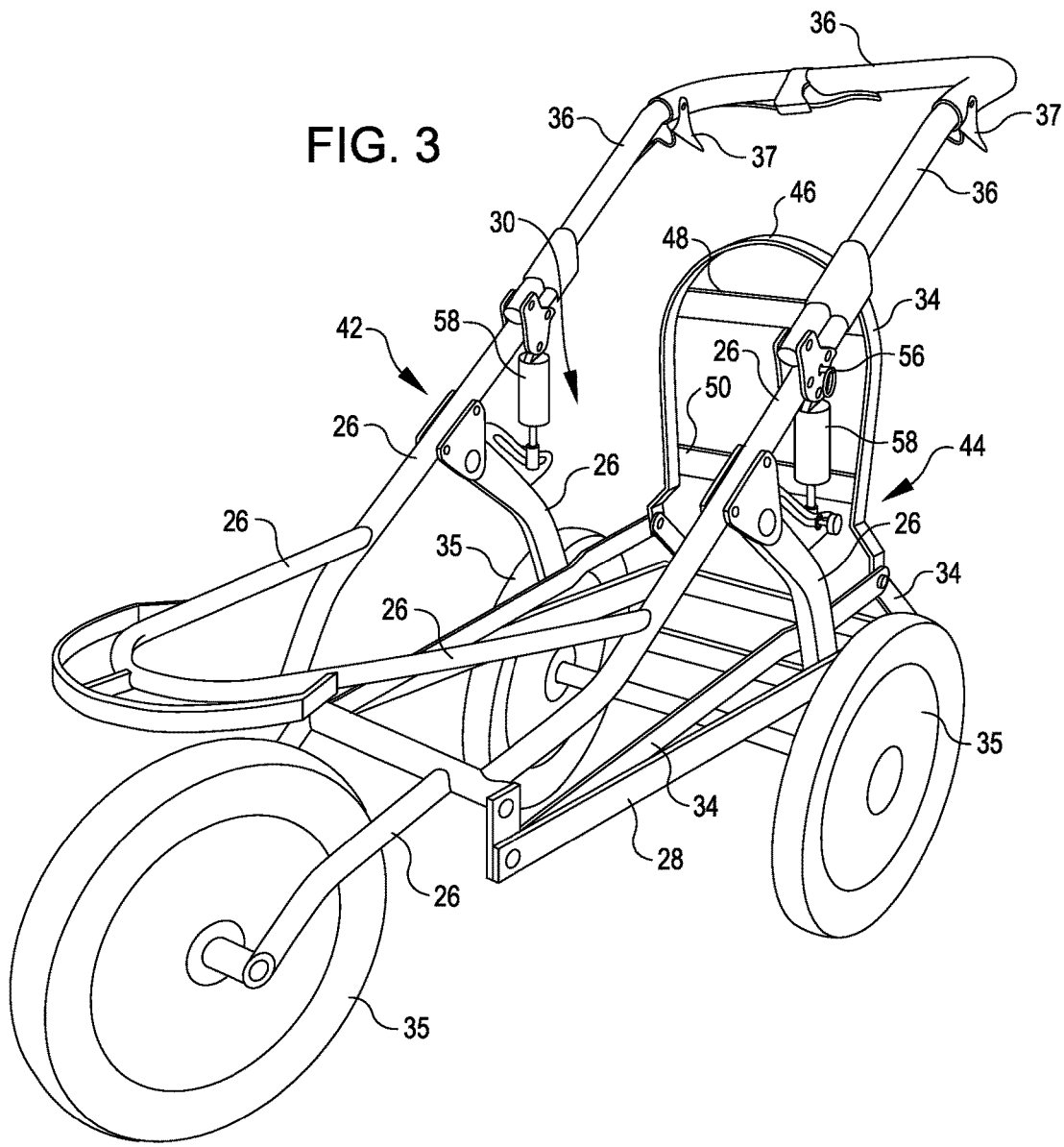
FIG. 3 shows a perspective view of the carrier shown in FIGS. 1 and 2 with the cooler and grill omitted, according to an embodiment of the invention.
Figure 4:
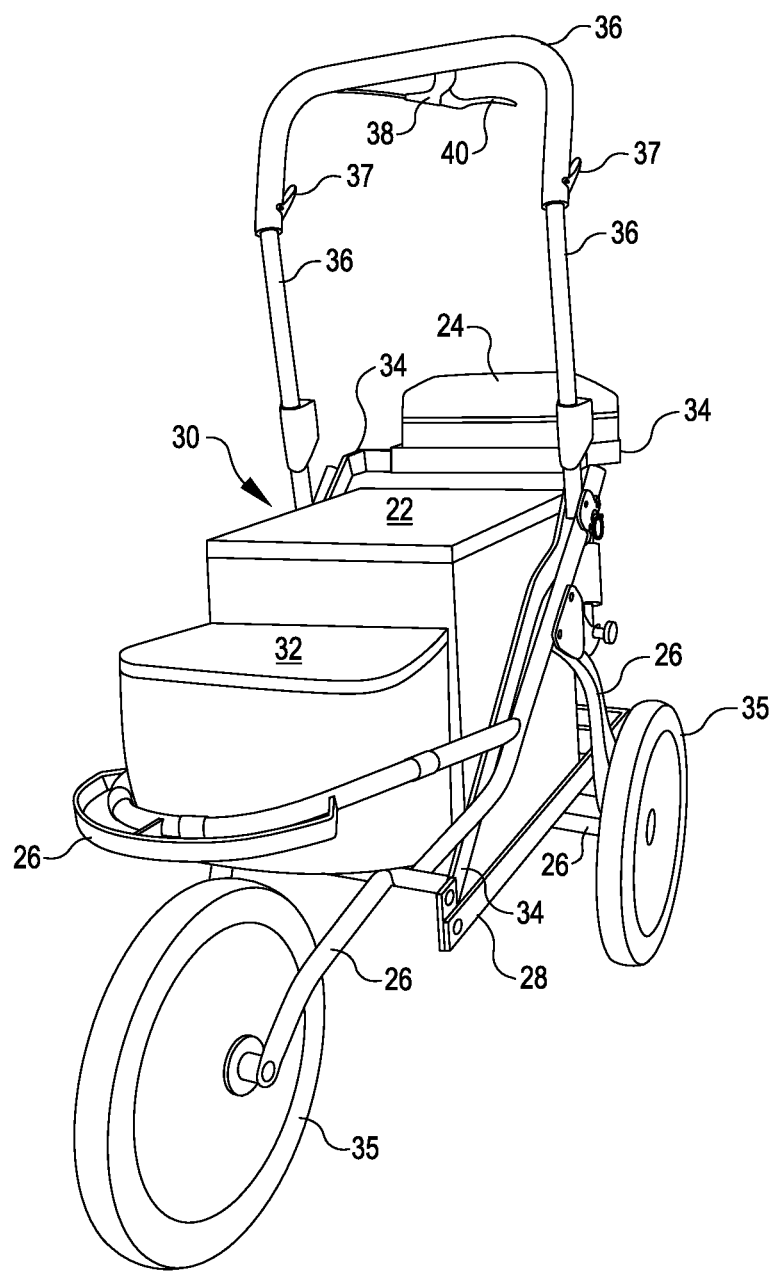
FIG. 4 shows a perspective view of the carrier shown in FIGS. 1, 2 and 3, with the grill positioned for cooking food, according to an embodiment of the invention.
Figure 5:
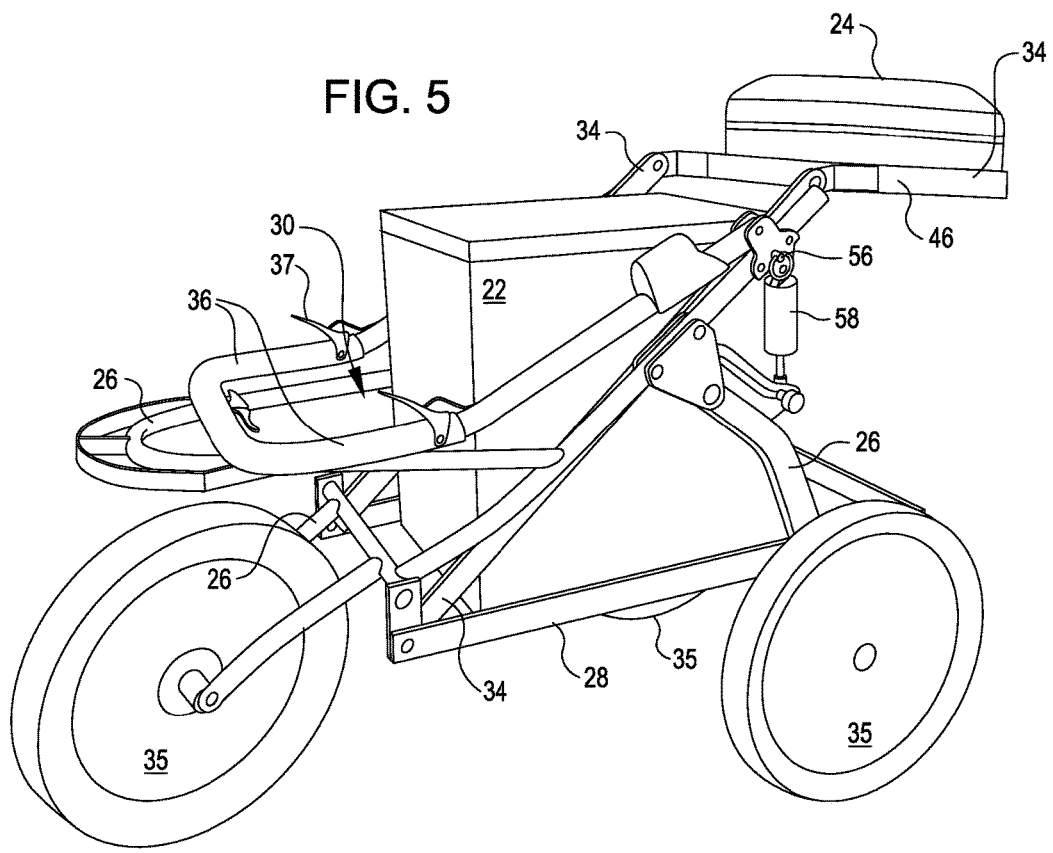
FIG. 5 shows a different perspective view of the carrier shown in FIG. 4, according to an embodiment of the invention.
Figure 6:
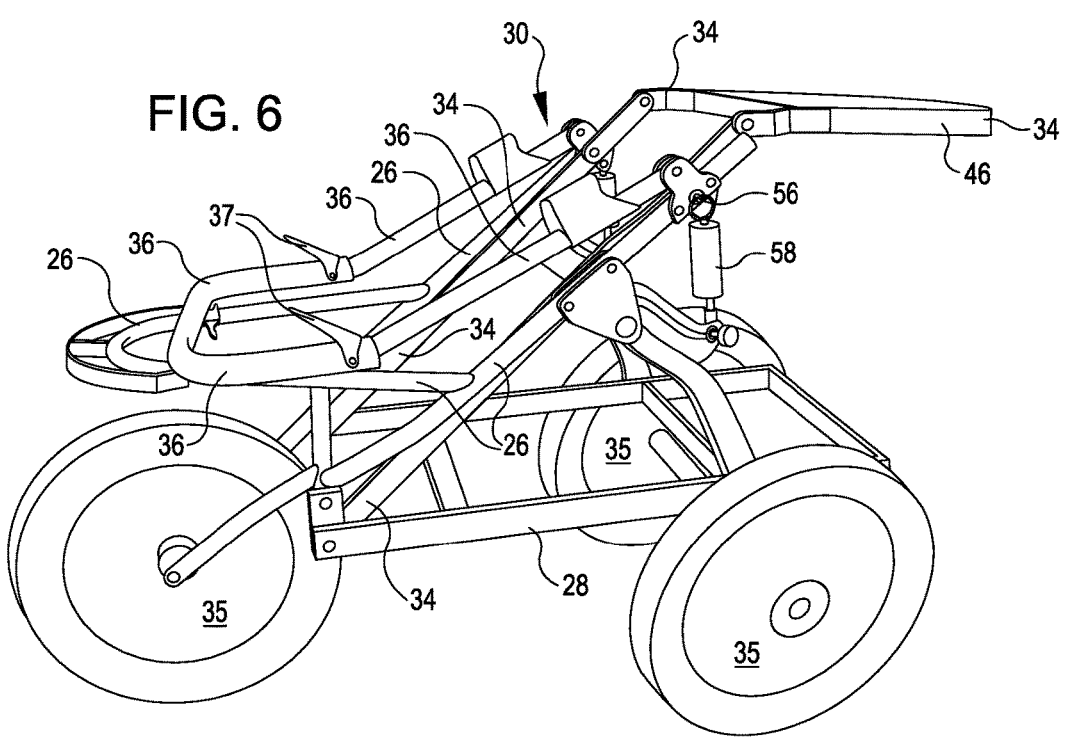
FIG. 6 shows a perspective view of the carrier shown in FIGS. 4 and 5 with the cooler and grill omitted, according to an embodiment of the invention.

Each of FIGS. 1 and 2 shows a perspective view of a carrier 20 transporting a cooler 22 and a grill 24, according to an embodiment of the invention. FIG. 3 shows the carrier 20 in FIGS. 1 and 2 with the cooler 22 and grill 24 omitted. Each of FIGS. 4 and 5 shows a perspective view of the carrier 20 in FIGS. 1 and 2 with the grill positioned for cooking food. And FIG. 6 shows the carrier 20 in FIGS. 4 and 5 with the cooler 22 and grill 24 omitted.

Figure 7:
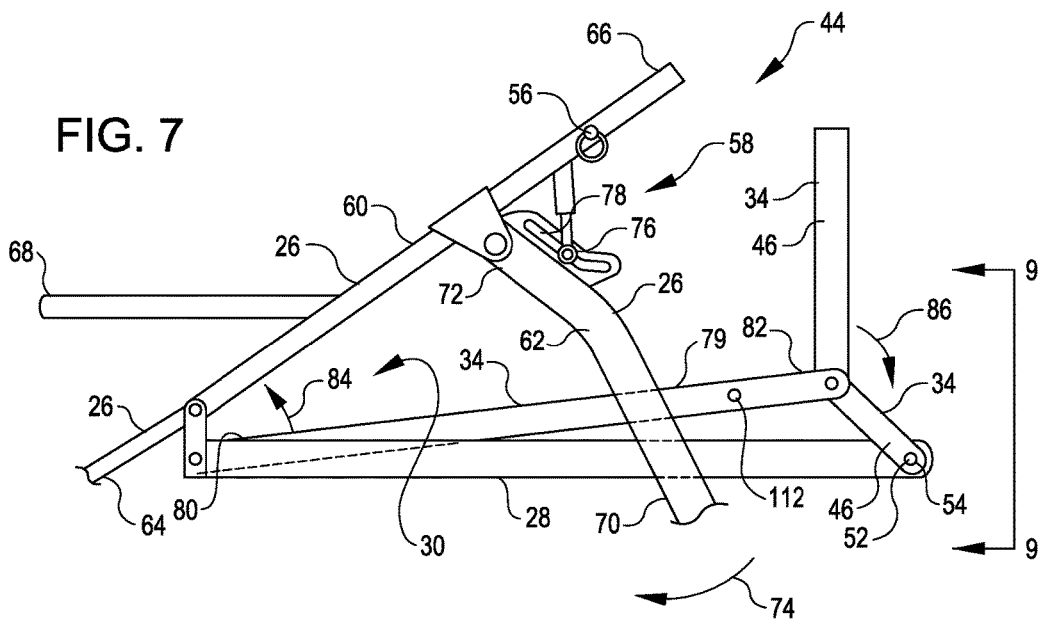
FIG. 7 shows a partial, side view of the carrier shown in FIGS. 1, 2 and 3 with the carrier's second frame positioned for storing a grill while transporting the grill, according to an embodiment of the invention.
Figure 8:
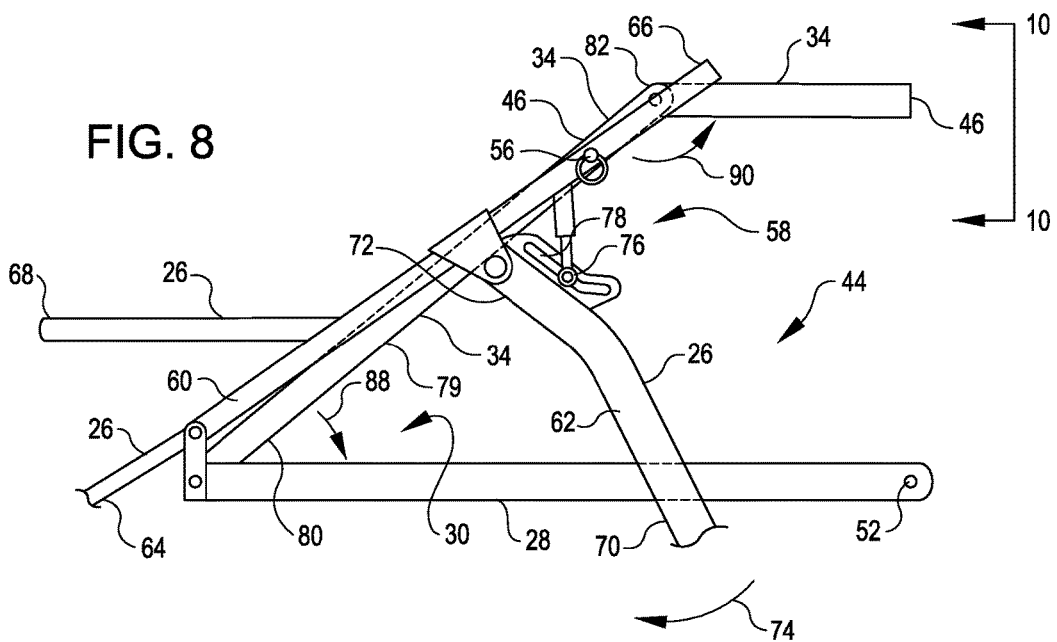
FIG. 8 shows a partial, side view of the carrier shown in FIGS. 4, 5 and 6 with the carrier's second frame positioned for holding a grill while cooking food with the grill, according to an embodiment of the invention.
Figure 9:
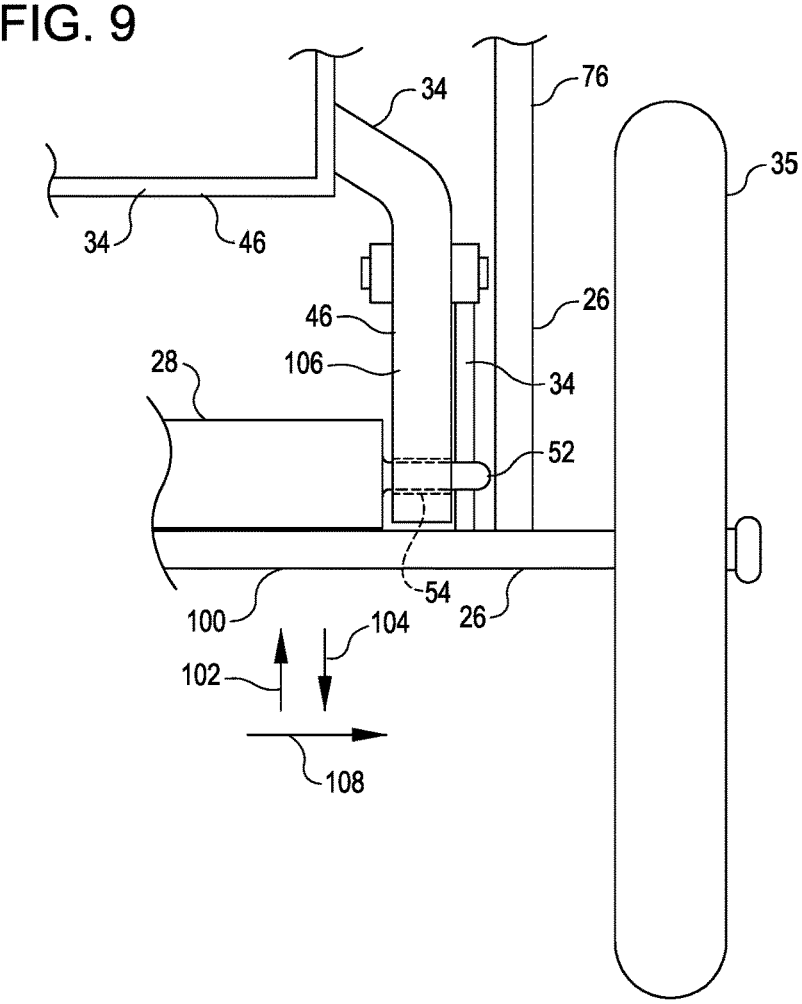
FIG. 9 shows a partial rear view of the carrier shown in FIG. 7, according to an embodiment of the invention.

Referring to FIGS. 1-6, the carrier 20 includes a chassis that has a first frame 26 that is discussed in greater detail in conjunction with FIGS. 7-11, and a floor 28 that is discussed in greater detail in conjunction with FIGS. 7-9. Together, the first frame 26 and the floor 28 define a receptacle 30 in which the cooler 22 is held. In this embodiment, the receptacle 30 also holds a container 32 that one may use to hold items such as dry goods (not shown) and utensils (not shown). The carrier 20 also includes a second frame 34 that is discussed in greater detail in conjunction with FIGS. 7-10. The second frame 34 holds the grill 24 and is positionable relative to the first frame 26 to a first position (shown in FIGS. 4-6, and discussed in greater detail in conjunction with FIGS. 8 and 10), and to a second position (shown in FIGS. 1-3, and discussed in greater detail in conjunction with FIGS. 7 and 9). In the first position, the second frame 34 positions the grill 24 to be used by one to cook food, such as hamburgers, steaks, fish and/or vegetables. In the second position, the second frame 34 holds the grill 24 adjacent the cooler 22 so that the carrier 20 may safely and stably transport the cooler 22 and grill 24 over difficult terrain. The carrier 20 also includes three wheels 35—one front wheel 35 and two rear wheels 35—that contact and roll over the terrain when the carrier 20 transports the cooler 22, grill 24 and container 32.

Because the receptacle 30 is disposed between the front and rear wheels 35, the carrier 20 can easily and stably transport a cooler full of ice, food and drinks. And because the second frame 34 of the carrier 20 is positionable relative to the first frame 26 of the carrier's chassis, the grill 24 may be easily positioned adjacent the cooler 22 while transporting the grill 24 and cooler 22 over difficult terrain, and repositioned above the cooler 22 while cooking food.

In the embodiment of the carrier 20 shown in FIGS. 1-6, the carrier 20 includes three wheels 35 arranged to form a triangular wheelbase with the front wheel 35 forming the top of the triangle and the two rear wheels 35 forming the bottom of the triangle. More specifically, the two rear wheels 35 are twenty inches apart and the front wheel 35 is twenty-seven inches ahead of the rear wheels 35. Each of the wheels 35 may be sized as desired to facilitate rolling over difficult terrain. For example, the wheels 35 may have a diameter of sixteen inches and a width of five inches to facilitate rolling, under the weight of the carrier 20 loaded with gear and food, over soft, dry sand like that found on an ocean beach. As another example, the wheels 35 may have a diameter of sixteen inches and a width of two inches to facilitate rolling over an unpaved trail. Each of the wheels 35 is coupled with an axle (not labeled) that may be releasably coupled with the first frame 26, such as the front wheel's axle or may be fixed to the first frame 26, such as the rear wheels' axles.

Other embodiments are possible. For example, the carrier 20 may include more than one front wheel and/or more or fewer than two rear wheels. As another example, the wheelbase of the carrier may be larger or smaller than the twenty-by-twenty-seven-inch wheelbase. As another example, the carrier 20 may include one or more skis to facilitate transporting the cooler 22 and grill 24 over snow or water. As yet another example, the carrier 20 may include one or more skates to facilitate transporting the cooler 22 and grill 24 over ice or compact snow.

The carrier 20 also includes a handle 36 that one can grasp while pushing or pulling the carrier 20 over terrain. The handle 36 is positionable relative to the first frame 26 to an extended position (shown in FIGS. 1-3) in which one can push or pull the carrier 20, and to a retracted position (shown in FIGS. 4-6) in which the handle 36 lies adjacent the first frame 26 to allow one to store the carrier 20 or position the second frame 34 in the first position so that one may use the grill 24 to cook. In this embodiment of the carrier 20, the handle 36 is coupled to the first frame 26 and pivoted relative to the first frame 26 to move the handle to and from the extended and retracted positions, as shown and discussed in greater detail in conjunction with FIG. 11. To release the handle 36 from the extend position and allow the handle 36 to pivot relative to the first frame 26, the carrier 20 includes two triggers 37 that one pivots toward the handle 36. The carrier 20 also includes a brake 38 (shown in FIGS. 1 and 4) that is similar to a conventional brake for a ten-speed bicycle. More specifically, the brake 38 includes a lever 40 (also shown in FIGS. 1 and 4) mounted to the handle 36, and a caliper (not shown) mounted to the first frame 26 adjacent the front wheel 35. When one moves the lever 40 toward the handle 36, the caliper squeezes the rim of the front wheel 35 and generates friction between the caliper and the rim, which resists the rotation of the front wheel 35. This, in turn, causes the carrier 20 to slow down or stop.

Other embodiments are possible. For example, the carrier 20 may have the handle 36 omitted and include a coupler to which one can attach a harness to pull the carrier. The harness may be configured to be worn by one or more dogs, or the harness may be configured to be worn by one or more people. As another example, the carrier 20 may include a motor, such as an electric and/or gas motor, to drive one or more of the wheels 35 and help one propel the carrier over terrain.

Still referring to FIGS. 1-6, the receptacle 30 may be sized and configured as desired. For example, in this and other embodiments of the carrier 20, the receptacle 30 is sized and configured to hold a cuboid-shaped cooler 22 that has an internal volume of 0.8 cubic feet in which to hold ice, food and/or drinks. More specifically, the floor 28 is rectangular shaped and has a length of twenty-seven inches and a width of sixteen inches. To accommodate the floor's width, the distance between the first frame's right side 42 (shown in FIGS. 1 and 3) and the first frame's left side 44 (also shown in FIGS. 1 and 3) is eighteen inches. With these floor dimensions, the receptacle has enough room to hold the container 32 in front of the cooler 22.

Other embodiments are possible. For example, the cooler 22 may have any configuration that will fit in the receptacle 30. As another example, the floor 28 may have a shape other than rectangular.

Similarly, the second frame 34 includes a component 46 that the grill 24 mounts to and that may be sized and configured as desired. For example, in this and other embodiments, the component 46 is sized and configured to hold a Coleman®, propane-powered grill that is D-shaped, twelve inches along the straight vertical portion of the "D", and fourteen inches from the straight, vertical portion to the apex of the curved portion of the "D". Furthermore, the component 46 includes a first strap 48 (shown in FIG. 3) to which a portion of the grill 24 is bolted, and a second strap 50 (also shown in FIG. 3) to which another portion of the grill 24 is bolted. As discussed in greater detail in conjunction with FIGS. 7-10, the component 46 pivots relative to the remainder of the second frame 34 to move the grill 24 to and from the first and second positions. When the second frame 34 is in the second position, the component 46 is held substantially vertical by two pins 52 (only one shown in FIG. 2) that each extend from the floor 28 and through a respective one of two holes 54 (also only one shown in FIG. 2) in the component 46. When the second frame 34 is in the first position, the component 46 is held substantially horizontal by two pins 56 (only one shown in FIGS. 1-3, 5 and 6) that each extend through a respective one of the two sides 42 and 44 of the first frame 26 and through a respective one of the two holes 54.

Other embodiments are possible. For example, the component 46 may be thirty-one inches by nine inches to accommodate a conventional Coleman®, two-burner grill that burns kerosene and is about thirty inches by eighteen inches by eight inches. As another example, the component 46 may be configured to hold a grill that burns briquettes to generate heat.

Still referring to FIGS. 1-6, the first frame 26 may also be configured, as desired to further fold into a compact arrangement to facilitate storing the carrier 20 when not in use. For example, in this and other embodiments, the first frame 26 includes a coupler 58 (shown in FIGS. 1, 2, 3, 5 and 6) that holds a respective one of the two rear wheels 35 in the transportation position (shown in FIGS. 1-6), and allows each of the respective rear wheels 35 to be pivoted relative to the remainder of the first frame 26 toward the front wheel 35 and into a storage position. In the storage position, each of the rear wheels 35 lies adjacent the front wheel 35. The coupler 58 is discussed in greater detail in conjunction with FIGS. 7 and 8.

Finally, the first frame 26, floor 28, second frame 34, and handle 36 may be made of any desired material capable of handling the loads that each will experience in use. For example, in this and other embodiments, each of the first frame 26, floor 28, second frame 34, and handle 36 are made of aluminum tubing to provide a substantial strength-to-weight ratio. This provides the carrier 20 with substantial strength and toughness while keeping the weight of the carrier 20 low. In other embodiments, each of the first frame 26, floor 28, second frame 34, and handle 36 may be made of another type of metal and/or plastic.

Each of FIGS. 7 and 8 shows a partial, side view of the carrier 20 shown in FIGS. 1-6. FIG. 7 shows the carrier 20 with the second frame 34 in the second position for storing a grill while transporting the grill, according to an embodiment of the invention. FIG. 8 shows the carrier 20 with the second frame 34 in the first position for cooking food, according to an embodiment of the invention. Although FIGS. 7 and 8 show one side of the carrier 20—the side that includes the left side 44 of the first frame 26—the other side of the carrier 20—the side that includes the right side 42 (FIG. 1) of the first frame 26—is similar to the shown side, and thus, the description that follows also applies to the side not shown.

As previously mentioned, the first frame 26 may be configured as desired. For example, in this and other embodiments, the first frame 26 includes a left side 44 and a right side (not shown). The left side 44 includes a longitudinal bar 60 and a link 62 that are coupled together with the coupler 58. The longitudinal bar 60 includes the first frame's front end 64 where the front wheel 35 (not shown) is located, and a third end 66 where the carrier's handle 36 (not shown) is coupled. The longitudinal bar 60 also includes an extension 68 that helps define the receptacle 30 and provides an additional grip that one may grasp to lift the carrier 20 or otherwise help propel the carrier 20 over terrain. The link 62 includes the first frame's rear end 70 where one of the rear wheels 35 is located, and a fourth end 72 that is pivotally coupled to the longitudinal bar 60. The coupler 58 holds the link 62 in the position shown so that the weight of the gear, food and ice held by the carrier 20, and/or the force of one pushing on the handle 36 to propel the carrier 20, doesn't collapse the carrier 20. When one wants to configure the carrier 20 for storage, one pivots the link 62 about the longitudinal bar 60 in the direction shown by the arrow labeled 74. While the link 62 pivots in the direction 74, the end 76 of the coupler 58 moves in the coupler's slot 78 toward the link's fourth end. When one wants to configure the carrier 20 for use, one pivots the link 62 in a direction opposite the direction shown by the arrow labeled 74.

The floor 28 may be coupled to the first frame 26 in any desired manner and at any desired location of the first frame 26. For example, in this and other embodiments, the floor 28 is coupled with the first frame's front end 64 and does not pivot relative to the first frame 26. To distribute the weight of the gear, food and ice held by the carrier 20, the floor 28 also rests on the axle (shown in FIG. 9) that couples the two rear wheels 35 together. This also reduces the stress and strain experienced by the longitudinal bar 60 where the floor is coupled with it. In other embodiments, the floor 28 may be pivotally coupled with the longitudinal bar 60.

Still referring to FIGS. 7 and 8, the second frame 34 may be coupled with the chassis in any desired manner and at any desired location that permits the second frame 34 to be positioned in the first position (FIG. 8) when one uses the grill, and to be positioned in the second position (FIG. 7) to transport gear, food, ice, and the grill. For example, in this and other embodiments, the second frame 34 includes a rail 79 that has a first end 80 pivotally coupled to the floor 28 adjacent the location of the floor 28 where the floor 28 is coupled to the longitudinal bar 60, and a second end 82 where the component 46 is pivotally attached. To position the second frame 34 from the second position to the first position, one first unlocks the component 46 from the second end 82 (discussed in greater detail in conjunction with FIG. 9). Then, one pivots the rail 79 in the direction indicated by the arrow 84. One also pivots the component 46 in the direction indicated by the arrow 86. One may pivot the component 46 while one pivots the rail 79, before one pivots the rail 79, and/or after one pivots the rail 79. When the rail 79 and the component 46 are positioned as shown in FIG. 8, the second frame 34 is in the first position. Then, one locks the rail 79 and component 46 to the longitudinal bar 60 (discussed in greater detail in conjunction with FIG. 10) to keep the second frame 34 in the first position. Similarly, to position the second frame 34 from the first position back to the second position, one first unlocks the rail 79 and component 46 from the longitudinal bar 60 (discussed in greater detail in conjunction with FIG. 10). Then, one pivots the rail 79 in the direction indicated by the arrow 88. One also pivots the component 46 in the direction indicated by the arrow 90. When the rail 79 and the component 46 are positioned as shown in FIG. 7, the second frame 34 is in the second position.

Figure 10:
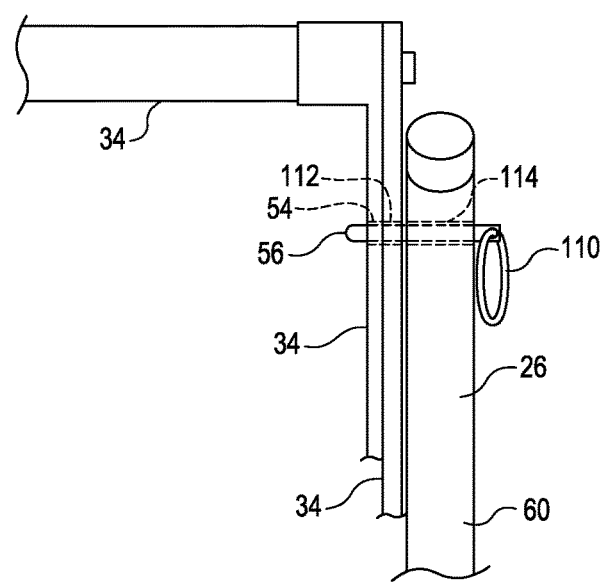
FIG. 10 shows a partial rear view of the carrier shown in FIG. 8, according to an embodiment of the invention.

Each of FIGS. 9 and 10, shows a partial rear view of the carrier 20 shown in FIGS. 7 and 8, according to an embodiment of the invention. FIG. 9 shows the carrier 20 with the second frame 34 in the second position, according to an embodiment of the invention. FIG. 10 shows the carrier 20 with the second frame 34 in the first position, according to an embodiment of the invention. More specifically, FIG. 9 shows the right side of the second frame 34 locked in the second position; unlike FIG. 7 which shows the left side of the second frame 34. And FIG. 10 shows the right side of the second frame 34 locked in the first position; unlike FIG. 8 which shows the left side of the second frame 34. Although FIGS. 9 and 10 only show the right side, the left side of the second frame 34 is similarly locked to the floor 28 and first frame 26, when the second frame 34 is locked in the second and first positions, respectively.

Referring to FIG. 9, the second frame 34 may be locked in the second position in any desired manner. For example, in this and other embodiments, the floor 28 includes the pin 52 that extends away from the floor 28 toward the rear wheel 35. When the second frame 34 is locked in the second position, the pin 52 extends through the hole 54 in the component 46. Because the floor 28 does not pivot relative to the first frame 26 and because the floor 28 contacts the axle 100 of the first frame 26, the pin 52 keeps the component 46 from moving relative to the first frame 26 in the directions indicated by the arrows 102 and 104. To align the hole 54 with the pin 52, one flexes the elastic ear 106 of the component 46 in the direction indicated by the arrow 108. To unlock the second frame 34 from the second position, one flexes the elastic ear 106 in the direction opposite the direction indicated by the arrow 108.

Referring to FIG. 10, the second frame 34 may be locked in the first position in any desired manner. For example, in this and other embodiments, the first frame 26 includes the pin 56 that one may grasp by the ring 110 to move the pin 56 into and out of each of the holes 54, 112 and 114. The hole 112 passes through the second end 82 of the second frame's rail 79, and the hole 114 passes through the first frame's longitudinal bar 60. When the second frame 34 is locked in the second position, the pin 56 extends through each of the holes 54, 112 and 114, and thus, prevents the second frame 34 from moving relative to the first frame 26, and prevents the component 46 from pivoting relative to the rail 79. To align the holes 112 and 114, one pivots the second frame 34 to the position shown in FIG. 8. To align the hole 54 with the aligned holes 112 and 114, one pivots the component 46 to the position shown in FIG. 8. After the holes 54, 112 and 114 are aligned, one inserts the pin 56 through each. To unlock the second frame 34 from the first position, one removes the pin 56 from the holes 54 and 112.

Figure 11:
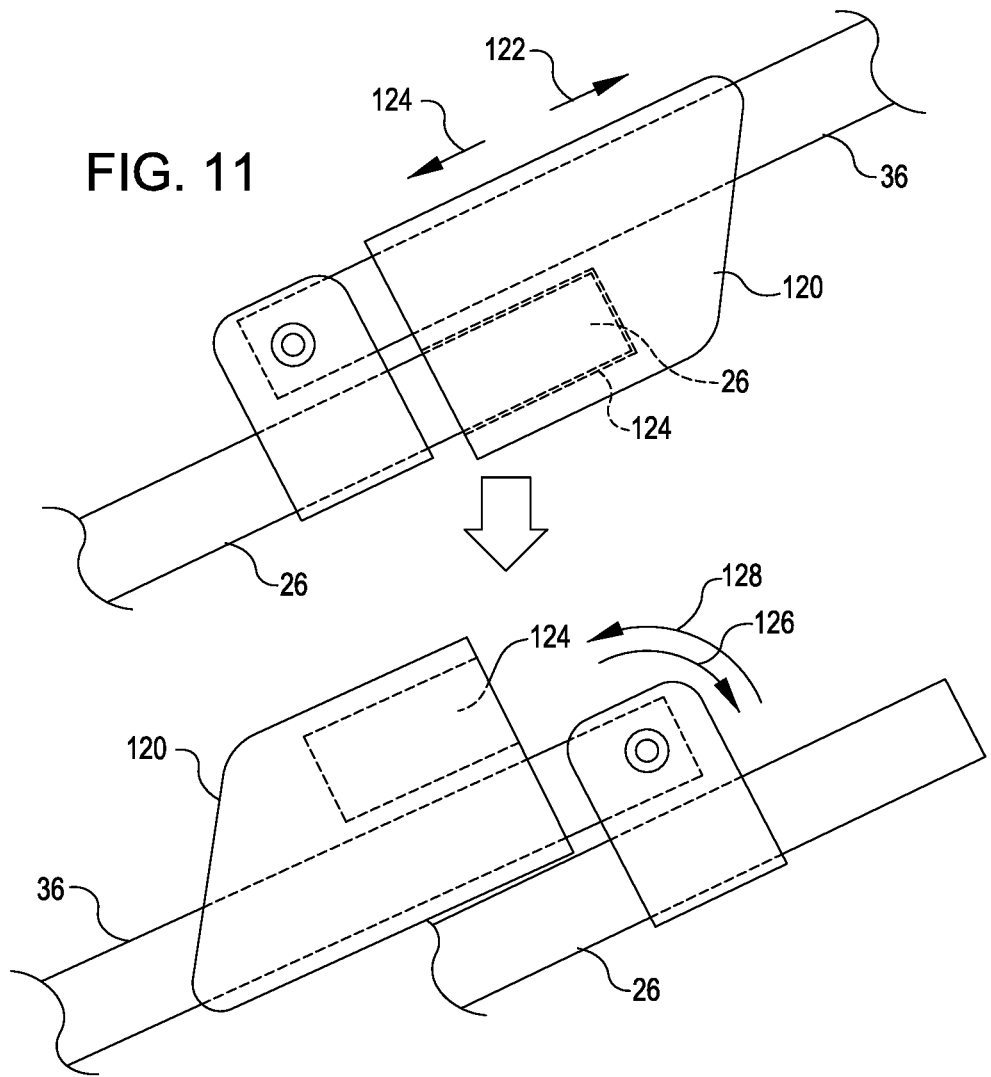
FIG. 11 shows two partial views of a handle of the carrier shown in FIGS. 1-6, according to an embodiment of the invention. In one view the handle is shown in an extended position, and in the other view the handle is shown in the retracted position.

FIG. 11 shows two partial views of the handle 36 of the carrier shown in FIGS. 1-6, according to an embodiment of the invention. In one view the handle 36 is shown in an extended position, and in the other view the handle 36 is shown in the retracted position.

The handle 36 may be coupled to the first frame 26 in any desired manner that permits the handle 36 to be positioned at the extended and retracted positions. For example, in this and other embodiments, the handle 36 includes a sleeve 120 that is moveable relative to the handle 36 in the directions indicated by the arrows 122 and 124. The sleeve 120 includes a receptacle 124 that is sized and configured to receive and hold the end of the first frame 26. When the receptacle 124 holds the first frame 26 (shown in the top view of FIG. 11), the handle 36 is in the extended position and may be used by one to propel the carrier 20 over terrain. To position the handle 36 to the retracted position (shown in the bottom view of FIG. 11), one moves the sleeve 120 in the direction indicated by the arrow 122 until the receptacle 124 no longer holds the end of the first frame 26. Then, one pivots the handle 36 relative to the first frame 26 in the direction indicated by the arrow 128. To position the handle 36 back to the extended position, one pivots the handle 36 in the direction indicated by the arrow 126 until the receptacle 124 is aligned with the end of the first frame 26. Then, one moves the sleeve in the direction indicated by the arrow 124 until the receptacle receives and holds the first frame's end.

Other embodiments are possible. For example, the handle 36 may be configured to slide into and out of the first frame 26 to locate the handle 36 closer to and farther away from, respectively, the rear wheels 35. As another example, the handle 36 may be coupled to the first frame 26, such that the handle 36 drops toward the rear wheels 35 when the handle 36 is positioned in the retracted position.

Figure 12:
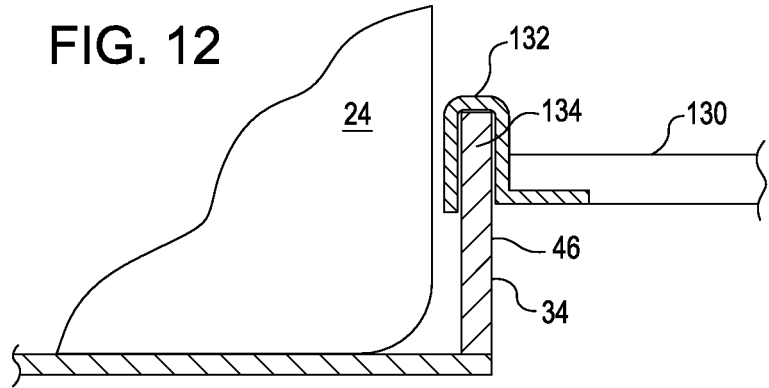
FIG. 12 shows a view of a cutting board mounted to a carrier's second frame, according to an embodiment of the invention.

FIG. 12 shows a view of a cutting board 130 mountable to a carrier, according to an embodiment of the invention. In this embodiment, the cutting board 130 includes a clip 132 that is configured to receive an edge 134 of the first frame's component 46. The cutting board 130 provides one a place to prepare food before, while or after cooking the food on the grill 24. The cutting board 130 may also be used to prepare food when the grill is not in use. Although, only one cutting board 130 is shown mounted to the edge 134, more than one may be mounted on the edge 134. Similarly, one or more cup holders (not shown) may hang from the first frame's component 46, or any other part of the carrier.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A carrier for transporting a grill and cooler over difficult terrain, the carrier comprising:
    a chassis that includes a first frame and a floor wherein:
        the first frame has:
            a front end that includes a front axle to which a front wheel is couplable with and rotatable about,
            a rear end that includes a rear axle to which a rear wheel is couplable with and rotatable about,
            a longitudinal bar that includes the first frame's front end, and that has a third end, and
            a link that includes the first frame's rear end, and that has a fourth end that is coupled with the longitudinal bar between the first frame's front end and the longitudinal bar's third end, and
        the floor is coupled with the first frame, and together, the first frame and the floor define a receptacle disposed between the front and rear wheel and configured to hold a cooler; and
    a second frame coupled with the chassis and operable to hold a grill, the second frame positionable relative to the first frame to:
        a first position where the grill is operable to cook food when the second frame holds the grill, and
        a second position where the grill is stored for transportation when the second frame holds the grill.

2. The carrier of claim 1 wherein the chassis includes one front wheel and two rear wheels arranged to form a triangle.

3. The carrier of claim 1 wherein the front and rear wheels each have a diameter of sixteen inches.

4. The carrier of claim 1 wherein the floor is rectangular and disposed between the front wheel and the rear wheel.

5. The carrier of claim 1 wherein the first frame includes a left side and a right side that are eighteen inches apart.

6. The carrier of claim 1 wherein:
    the chassis includes one front wheel and two rear wheels arranged to form a triangle, the two rear wheels are twenty inches apart, and the front wheel is twenty-seven inches ahead of the rear wheels,
    the first frame includes a left side and a right side that are eighteen inches apart, and
    the floor is rectangular, has a length of twenty-seven inches, a width of sixteen inches, and is disposed between the front wheel and the rear wheels such that the floor lies behind the front wheel and extends aft of the rear wheels.

7. The carrier of claim 1 wherein:
the first frame includes a left side and a right side that are eighteen inches apart, and each of the sides includes:
a longitudinal bar that includes the first frame's front end, and that has a third end, and
a link that includes the first frame's rear end, and that has a fourth end that is coupled with the longitudinal bar between the first frame's front end and the longitudinal bar's third end.

8. The carrier of claim 7 wherein each of the links is pivotable relative to its respective longitudinal bar.

9. The carrier of claim 1 wherein the receptacle defined by the first frame and the floor, and disposed between the front and rear wheel, is configured to also hold a container.

10. The carrier of claim 1 wherein the chassis includes a handle that is coupled with the first frame and positionable relative to the first frame to:
an extended position where the handle extends away from the first frame to allow one to grip the handle to move the device, and
a retracted position where the handle lies adjacent the first frame to allow one to store the device.

11. The carrier of claim 10 wherein the handle pivots relative to the first frame when moving the handle toward its extended position, and when moving the handle toward its retracted position.

12. The carrier of claim 1 wherein:
the floor is coupled with the longitudinal bar between the first frame's front end and the longitudinal bar's third end, and
the second frame is coupled with the floor and pivots relative to the floor when moving the second frame toward the first position and when moving the second frame toward the second position.

13. A system comprising:
a grill;
a cooler; and
a carrier for transporting the grill and the cooler over difficult terrain, the carrier comprising:
a chassis that includes a first frame, a floor, and a handle, wherein:
the first frame has:
a front end that includes a front axle to which a front wheel is coupled with and rotatable about,
a rear end that includes a rear axle to which a rear wheel is coupled with and rotatable about,
a longitudinal bar that includes the first frame's front end and that has a third end, and
a link that includes the first frame's rear end, and that has a fourth end that is coupled with the longitudinal bar between the first frame's front end and the longitudinal bar's third end, and
the floor is coupled with the first frame, and together, the first frame and the floor define a receptacle disposed between the front and rear wheel and holds the cooler; and
a second frame coupled with the chassis and that holds the grill, the second frame positionable relative to the first frame to:
a first position where the grill is operable to cook food, and
a second position where the grill is stored for transportation.

14. The system of claim 13 wherein the grill burns gas to generate heat.

15. The system of claim 13 wherein the cooler includes an internal volume that is 0.8 cubic feet.

16. The system of claim 13 further comprising a container disposed in the receptacle.

17. The system of claim 13 further comprising a cutting board mountable to the second frame when the second frame is in the first position.

18. The system of claim 13 further comprising a cup holder mountable to the first frame.

19. A method for transporting a grill and cooler over difficult terrain, the method comprising:
holding, with a second frame of a carrier's chassis, a grill that is operable to cook food, wherein the second frame is coupled with a first frame of the chassis, the first frame having a front end, a rear end, a longitudinal bar that includes the first frame's front end and that has a third end, and a link that includes the first frame's rear end and that has a fourth end that is coupled with the longitudinal bar between the first frame's front end and the longitudinal bar's third end, and wherein the second frame is positionable relative to the first frame to a first position where the grill is operable to cook food, and a second position where the grill is stored for transportation;
holding, in a receptacle that is defined by the first frame and a floor of the carrier's chassis, a cooler that is operable to keep an internal volume at a temperature that is lower than the ambient environment's temperature, wherein the receptacle is disposed between a front wheel of the chassis and a rear wheel of the chassis;
moving the carrier such that the front and rear wheels roll over the difficult terrain.

20. The method of claim 19 wherein the difficult terrain includes a sandy beach.

* * * * *